(12) United States Patent
Ogusu

(10) Patent No.: US 6,674,969 B1
(45) Date of Patent: Jan. 6, 2004

(54) TWO-OPTICAL SIGNAL GENERATOR FOR GENERATING TWO OPTICLE SIGNALS HAVING ADJUSTABLE OPTICAL FREQUENCY DIFFERENCE

(75) Inventor: Masahiro Ogusu, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/511,095

(22) Filed: Feb. 23, 2000

(30) Foreign Application Priority Data

Feb. 23, 1999 (JP) .......................................... 11-044857
Jan. 26, 2000 (JP) ...................................... 2000-017031

(51) Int. Cl.[7] .............................................. H04J 14/02
(52) U.S. Cl. ........................................... 398/79; 398/91
(58) Field of Search .............................. 398/82, 91, 95, 398/115, 116, 186, 201; 372/18, 19, 26

(56) References Cited

U.S. PATENT DOCUMENTS 5,379,309 A * 1/1995 Logan, Jr. ..................... 372/18
6,559,986 B1 * 5/2003 Sauer et al. ................... 398/79

OTHER PUBLICATIONS

*Opticle millimetre–wave generation and transmission experiments for mobile 60 GHz band communications*, R.P. Braun, et al., Electronics Letters, vol. 32, No. 7, pp. 626–628, Mar. 28, 1996.
*Further Observations on the Optical Generation of Millimetre–wave Signals by Master/Slave Laser Sideband Injection Locking*, D.S. George et al.
*Low phase noise millimetre–wave signal generation using a passively modelocked monolithic DBR laser injection locked by an optical DSBSC signal*, Z. Ahmed, et al., Electronics Letters, vol. 31, No. 15, pp. 1254–1255, Jul. 20, 1995.
*Novel Techniques for High–Capacity 60–GHz Fiber–Radio Transmission Systems*, L. Noel, et al., IEEE Transactions on Microwave Theory and Techniques, vol. 45, No. 8, pp. 1416–1423, Aug. 1997.
*Low–Phase–Noise Millimeter–Wave Generation at 64 GHz and Data Transmission Using Optical Sideband Injection Locking*, R.–P. Braun et al., IEEE Photonics Technology Letters, vol. 10, No. 5, pp. 728–730, May 1998.

* cited by examiner

*Primary Examiner*—Leslie Pascal
*Assistant Examiner*—Dalzid Singh
(74) *Attorney, Agent, or Firm*—Birch, Stewart, Kolasch & Birch, LLP

(57) ABSTRACT

A two-optical signal generator is provided for generating two optical signals, where a difference between optical frequencies or optical wavelength of the two optical signals can be adjusted. A first optical modulator modulates a single-mode optical signal generated by a first light source according to an inputted signal, and outputs a modulated optical signal including predetermined specific two optical signals having a predetermined optical frequency difference, while a second light source generates a multi-mode optical signal including predetermined two further optical signals having substantially the same wavelengths as those of the predetermined specific two optical signals of the modulated optical signal, respectively. Then an optical injection device optically injects the modulated optical signal into the second light source, and the predetermined specific two optical signals of the modulated optical signal are injection-locked into the predetermined two further optical signals of the multi-mode optical signal, so that the second light source generates an injection-locked predetermined specific two optical signals.

1 Claim, 13 Drawing Sheets

Fig.2 MODIFIED PREFERRED EMBODIMENT OF FIRST PREFERRED EMBODIMENT OPTICAL TRANSMITTER 101aa

THIRD PREFERRED EMBODIMENT
OPTICAL FIBER LINK SYSTEM

Fig.5 FOURTH PREFERRED EMBODIMENT OPTICAL FIBER LINK SYSTEM

Fig.7 MODIFIED PREFERRED EMBODIMENT

FIRST PRIOR ART
OPTICAL FIBER LINK SYSTEM

TWO-OPTICAL SIGNAL GENERATOR FOR GENERATING TWO OPTICLE SIGNALS HAVING ADJUSTABLE OPTICAL FREQUENCY DIFFERENCE

BACKGROUND OF THE INVENTION

1. Field of the Invention

The present invention relates to a two-optical signal generator for use in an optical fiber link system or the like, and in particular, to two-optical signal generator for generating two optical signals, where a difference between optical frequencies or optical wavelengths of the two optical signals can be adjusted. In the specification, the difference between the optical frequencies is referred to as an optical frequency difference hereinafter, and the difference between the optical wavelength is referred to as an optical wavelength difference hereinafter.

2. Description of the Related Art

An optical fiber link system modulates a digital data signal into an optical signal, transmits a modulated optical signal to a radio base station, performs photoelectric conversion for a received optical signal to output a radio signal, which is then power-amplified and radio-transmitted from an antenna of a radio base station.

FIG. 11 is a block diagram showing a configuration of an optical fiber link system of a prior art.

Referring to FIG. 11, a light source 1 such as a semiconductor laser or the like modulates an optical signal according to an inputted digital data signal, and outputs a modulated optical signal as a first optical signal (optical frequency f1) via an optical combining circuit 3 and an optical branch circuit 4 to an optical amplifier 5. On the other hand, a light source 2 such as a semiconductor laser or the like has its optical frequency controlled by an optical frequency controller 10, and generates and outputs an optical signal as a second optical signal (optical frequency f2) via the optical combining circuit 3 and the optical branch circuit 4 to the optical amplifier 5. In this case, a difference |f1−f2| in the optical frequency is set to, for example, a radio frequency in a millimeter-wave band of several tens to several hundreds GHz, as shown in FIG. 13. The optical amplifier 5 amplifies a power of an inputted optical signal, and then, transmits a power-amplified optical signal to an optical receiver 200 via an optical fiber cable 300 for connecting an optical transmitter 101 and an optical receiver 200 located in the radio base station.

On the other hand, a mixture optical signal obtained by mixing the first and second optical signal branched by the optical branch circuit 4 is photoelectrically converted by a photoelectric converter 6 which comprises a high-speed photodiode with a nonlinear photoelectric conversion characteristic, and then, the photoelectrically converted signal is frequency-converted into a high-frequency signal having a frequency lower than that of the photoelectrically converted signal by a frequency converter which consists of a millimeter wave signal oscillator 7 and a mixer 8. Then, from the components of the thus converted high-frequency signal, a high-frequency signal, which is in proportion to an optical frequency difference |f1−f2| and which has been generated by the above-mentioned nonlinear photoelectric conversion characteristic, is taken out by a band-pass filter 9, and then, is outputted to an optical frequency controller 10. In such an optical frequency loop circuit as configured above, based on the inputted high-frequency signal, the optical frequency controller 10 controls the optical frequency f2 of the second optical signal generated from the light source 2 so that the above-mentioned optical frequency difference |f1−f2| becomes the constant. That is, an interference component between the two optical signals is taken out by the photoelectric converter 6 so that an oscillation frequency difference between the oscillation frequency of the light source 1 and that of the light source 2 becomes a millimeter wave frequency, the taken interference component is compared in frequency with the millimeter-wave frequency of the millimeter-wave signal generator 7, and then, the optical frequency of the light source 2 is controlled in accordance with its error signal. The optical transmitter 101 is disclosed in, for example, a first prior art document of, R. P. Braun, et al., "Optical millimeter-wave generation and transmission experiments for mobile 60 GHz band Communications," Electronics Letters, Vol. 32, pp. 626–627, 1996 (hereinafter referred to as a first prior art).

In the optical receiver 200, an optical amplifier 11 receives an optical signal through the optical fiber cable 300, and then, outputs the same optical signal to a photoelectric converter 12. The photoelectric converter 12 comprises a high-speed photodiode having a nonlinear photoelectric conversion characteristic, photoelectrically converts the inputted optical signal into an electric signal, and outputs the same electric signal to a band-pass filter 13. From the signal components of the photoelectrically converted signal, the band-pass filter 13 takes out a radio signal of a millimeter-wave band corresponding to the optical frequency difference f0=|f1−f2| which has been generated by the above-mentioned nonlinear photoelectric conversion characteristic, and then, outputs the same radio signal to a radio transmitter 14. The radio transmitter 14 comprises a power amplifier which power-amplify the inputted radio signal, and transmits the same radio signal via an antenna 15 toward, for example, an antenna 91 connected to a radio receiver 210 shown in FIG. 12.

FIG. 12 is a block diagram showing a configuration of the radio receiver 210 according to the first prior art.

Referring to FIG. 12, the radio signal received by the antenna 91 is amplified by a low-noise amplifier 92, which then outputs the received radio signal to a mixer 94 via a band-pass filter 93 which passes therethrough only a radio signal having a frequency f0 of the millimeter-wave band. The mixer 94 mixes the inputted radio signal with a local oscillation signal having a local oscillation frequency equal to an addition result of the above-mentioned millimeter-wave frequency f0 generated by a millimeter-wave signal oscillator 95 to a predetermined intermediate frequency, so as to generate a received base-band signal having an intermediate frequency of a frequency difference between these two signals, and then, outputs the received base-band signal, via a band-pass filter 96 which passes therethrough only the signal component of the intermediate frequency band, and via a signal amplifier 97 to a demodulator (not shown). Then, the demodulator demodulates the received base-band signal into the original digital data signal.

Also, a second prior art document of, D. S. George et al., "Further Observations on the Optical Generation of Millimeter-wave Signals by Master/Slave Laser Side-band Injection Locking," MWP' 97, Post-Deadline Papers, PDP-2, 1997, discloses a constitution of a two-optical signal generator (hereinafter referred to as a second prior art) utilizing a heterodyne interference of two light waves in such a configuration provided with two single-mode semiconductor lasers that an optical signal from a slave laser is intensity-modulated according to a sine-wave signal, and the resultant higher-order mode frequency of the intensity-modulated optical signal is locked into a frequency of a master laser.

Also, the following optical transmission system has been proposed as a system for transmitting optical signals using three distributed feedback semiconductor lasers.

Further, a third prior art document of, Z. Ahmed, et al., "Low phase noise millimeter-wave signal generation using a passively mode-locked monolithic DBR laser injection locked by an optical DSBSC signal," Electronics Letters, Vol. 31, No. 15, pp.1254, 1995, discloses a two-optical signal generator (hereinafter referred to as a third prior art) utilizing a heterodyne interference of two light waves, in such a configuration that a distributed Bragg reflection-type semiconductor laser (hereinafter referred to as a DBR laser) having a supersaturated absorption layer is made to oscillate in a plurality of modes, and two side band lights generated using an intensity modulation by an external apparatus is injection-locked into the DBR laser.

A fourth prior art document of, L. Noel et al., "Novel Technique for High-Capacity 60-GHz Fiber-Radio Transmission Systems," IEEE Transactions on Microwave Theory and Techniques, Vol. 45, No. Aug. 8, 1997, discloses an optical fiber link system (hereinafter referred to as a fourth prior art) for spatial transmission of a millimeter-wave signal. The optical fiber link system comprises:

(a) a millimeter-wave light source for generating two optical signals having a millimeter-wave band frequency difference from each other, by using two, first and second distributed feedback semiconductor lasers; and (b) a third distributed feedback semiconductor laser having an optical frequency different from those of these lasers of millimeter-wave light sources, where a generated optical signal from the third distributed feedback semiconductor laser is directly modulated according to a data signal. In this fourth prior art, at a transmission apparatus, two optical signals generated by the above-mentioned millimeter-wave light source and an optical signal generated by the above-mentioned third distributed feedback semiconductor laser are wavelength-multiplexed and transmitted. On the other hand, at a receiving apparatus, the former two optical signals and the latter optical signal are wavelength-separated by an optical filter or the like, the respective separated optical signals are photoelectrically converted into electric signals by a photoelectric converter, and then, one of these photoelectrically converted electric signals is mixed with a predetermined local oscillation signal to obtain an original millimeter-wave signal.

Further, a fifth prior art document of, R. P. Braun et al., "Low-Phase-Noise Millimeter-Wave Generation at 64 GHz and Data Transmission Using Optical Sideband Injection Locking," IEEE Photonics Technology Letters, Vol. 10, No. 5, pp. 728–730, May 1998, discloses a system (hereinafter referred to as a fifth prior art) having such a configuration that a digital data signal is inputted as a bias current into a first distributed feedback semiconductor laser so as to directly intensity-modulate an optical signal generated by this semiconductor laser according to the sine-wave signal, and then, higher-order modulation components of the resultant optically modulated signal is injection-locked into second and third distributed feedback semiconductor lasers via a 3-dB photo-coupler so as to obtain a two-mode optical signal. In this fifth prior art, when weak modulation is conducted on the second or third distributed feedback semiconductor laser, this leads to an effect of AM-PM conversion due to an action of injection locking and then to such a effect that the optical frequency of the locked output light becomes constant with a phase being modulated. The system of the fifth prior art utilizes this phase modulation and transmits the phase-modulated optical signal.

However, the first prior art suffers from such a problem that the phase noise characteristic of the millimeter-wave signal deteriorates due to a limitation of frequency stabilization by using a frequency control circuit, and this leads to that the optical transmitter of the first prior art cannot be used as it is in radio communications.

Also, the second prior art suffers from such a problem that, although the millimeter-wave frequency can be changed by adjusting the modulation frequency of the sine-wave signal, the setting precision of the frequencies fluctuate with a range up to approximately 200 MHz, and then, it is extremely low.

Further, the third prior art has the distributed feedback optical filter in the laser, so suffers from a small frequency range in which the laser can oscillate, and also from a high Q value as a laser resonator, and this results in not only a small locking pull-in range, but also a small variable range of the carrier wave frequency.

Furthermore, in the fourth prior art, for the purpose of wavelength-separation, it is necessary to provide expensive optical filters for each of the radio base stations at the receiving side, and it is also necessary to provide an additional mixer in a signal processing circuit for processing electric signals. This leads to that it is necessary to provide a lot of electric parts for high frequencies. Therefore, there is such a problem that the cost of the radio base station becomes extremely high as the number of radio base stations increases.

Still further, the fifth prior art has such a feature that it is not necessary to provide any modulation for superimposing a millimeter wave signal onto an optical signal. However, the fifth prior art suffers from such a problem that it is necessary to provide three distributed feedback semiconductor lasers which are well matched in oscillation frequency.

SUMMARY OF THE INVENTION

A first object of the present invention is to solve the above-mentioned problems, and to provide a two-optical signal generator, capable of changing the frequency of the differences between those of the two optical signals generated by the two-optical signal generator, with a range wider than those of the first to third prior arts, and having a high precision for setting the frequencies.

A second object of the present invention is to solve the above-mentioned problems, and to provide a two-optical signal generator, which has a configuration simpler than that of the fourth prior art, which has a manufacturing cost lower than that of the fourth prior art, and which is capable of transmitting an optical signal according to a data signal.

A third object of the present invention is to solve the above-mentioned problems, and provide a two-optical signal generator, which can be constituted by comprising only two distributed feedback semiconductor lasers having different oscillation frequencies, and which is capable of transmitting an optical signal according to a data signal.

In order to achieve the aforementioned objective, according to one aspect of the present invention, there is provided a two-optical signal generator comprising:

a first light source for generating a single-mode optical signal;

first optical modulation means for modulating the optical signal generated by said first light source according to an inputted signal, and outputting a modulated optical signal including predetermined specific two optical signals having a predetermined optical frequency difference;

a second light source for generating a multi-mode optical signal including predetermined two further optical signals having substantially the same wavelengths as those of the predetermined specific two optical signals of the modulated optical signal, respectively; and optical injection means for optically injecting the modulated optical signal outputted from said first optical modulation means into said second light source, wherein the predetermined specific two optical signals of the modulated optical signal are injection-locked into the predetermined two further optical signals of the multi-mode optical signal, so that said second light source generates an injection-locked predetermined specific two optical signals.

The above-mentioned two-optical signal generator preferably further comprises:

second optical modulation means, provided between said first light source and said first optical modulation means, for modulating the optical signal generated by said first light source according to an inputted data signal, and outputting a modulated further optical signal to said first optical modulation means.

In the above-mentioned two-optical signal generator, the first light source generates a single-mode optical signal, modulates the generated optical signal according to an inputted data signal, and outputs a modulated further optical signal.

According to another aspect of the present invention, there is provided a two-optical signal generator comprising:

a first light source for generating a single-mode optical signal, modulating the generated optical signal according to an inputted signal, and outputting a modulated optical signal including predetermined specific two optical signals having a predetermined optical frequency difference;

a second light source for generating a multi-mode optical signal including predetermined two further optical signals having substantially the same wavelengths as those of the predetermined specific two optical signals of the modulated optical signal, respectively; and optical injection means for optically injecting the modulated optical signal outputted from said first optical modulation means into said second light source, and optically injecting the optical signal outputted from said second light source into said first light source, wherein the predetermined specific two optical signals of the modulated optical signal are injection-locked into the predetermined two further optical signals of the multi-mode optical signal, so that said second light source generates an injection-locked predetermined specific two optical signals.

The above-mentioned two-optical signal generator preferably further comprises:

optical modulation means, provided between said first light source and said second light source, for modulating the optical signal generated by said first light source according to an inputted data signal, and outputting a modulated further optical signal to said second light source.

According to a further aspect of the present invention, there is provided a two-optical signal generator comprising:

a first light source for generating a single-mode optical signal;

optical modulation means for modulating the optical signal generated by said first light source according to an inputted signal, and outputting a modulated optical signal including predetermined specific two optical signals having a predetermined optical frequency difference;

a second light source for generating a multi-mode optical signal including predetermined two further optical signals having substantially the same wavelengths as those of the predetermined specific two optical signals of the modulated optical signal, respectively, modulating the generated multi-mode optical signal according to an inputted data signal, and outputting a modulated multi-mode optical signal; and optical injection means for optically injecting the modulated optical signal outputted from said optical modulation means into said second light source, wherein the predetermined two further optical signals of the modulated optical signal optically injected are injection-locked into the predetermined specific two optical signals of the multi-mode optical signal, and wherein the injection locking is turned on or off in accordance with a level of the data signal, thereby switching over whether or not said second light source generates the predetermined specific two optical signals.

According to a still further aspect of the present invention, there is provided a two-optical signal generator comprising:

a first light source for generating a single-mode first optical signal-having a predetermined first wavelength;

optical modulation means for modulating the first optical signal generated by said first light source according to an inputted signal, and outputting a modulated first optical signal including predetermined specific two optical signals having a predetermined optical frequency difference;

a second light source for generating a single-mode second optical signal having a second wavelength different from the first wavelength, modulating the generated second optical signal according to an inputted data signal, and outputting a modulated second optical signal;

a third light source for generating a multi-mode optical signal including a plurality of optical signals which are mode-coupled, said multi-mode optical signal including:

(a) predetermined two further optical signals having substantially the same wavelengths as those of the predetermined specific two optical signals of the modulated first optical signal, respectively, and (b) another optical signal having substantially the same wavelength as that of the second optical wavelength; and optical injection means for optically injecting the modulated first optical signal outputted from said optical modulation means and the modulated second optical signal outputted from said second light source, into said third light source, wherein the predetermined specific two optical signals of the modulated first optical signal are injection-locked into the predetermined two further optical signals of the multi-mode optical signal, and the modulated second optical signal are injection-locked into another optical signal of the multi-mode optical signal, and wherein the two injection locking are turned on or off in accordance with a level of the data signal, thereby switching over whether or not said second light source generates the predetermined specific two optical signals.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
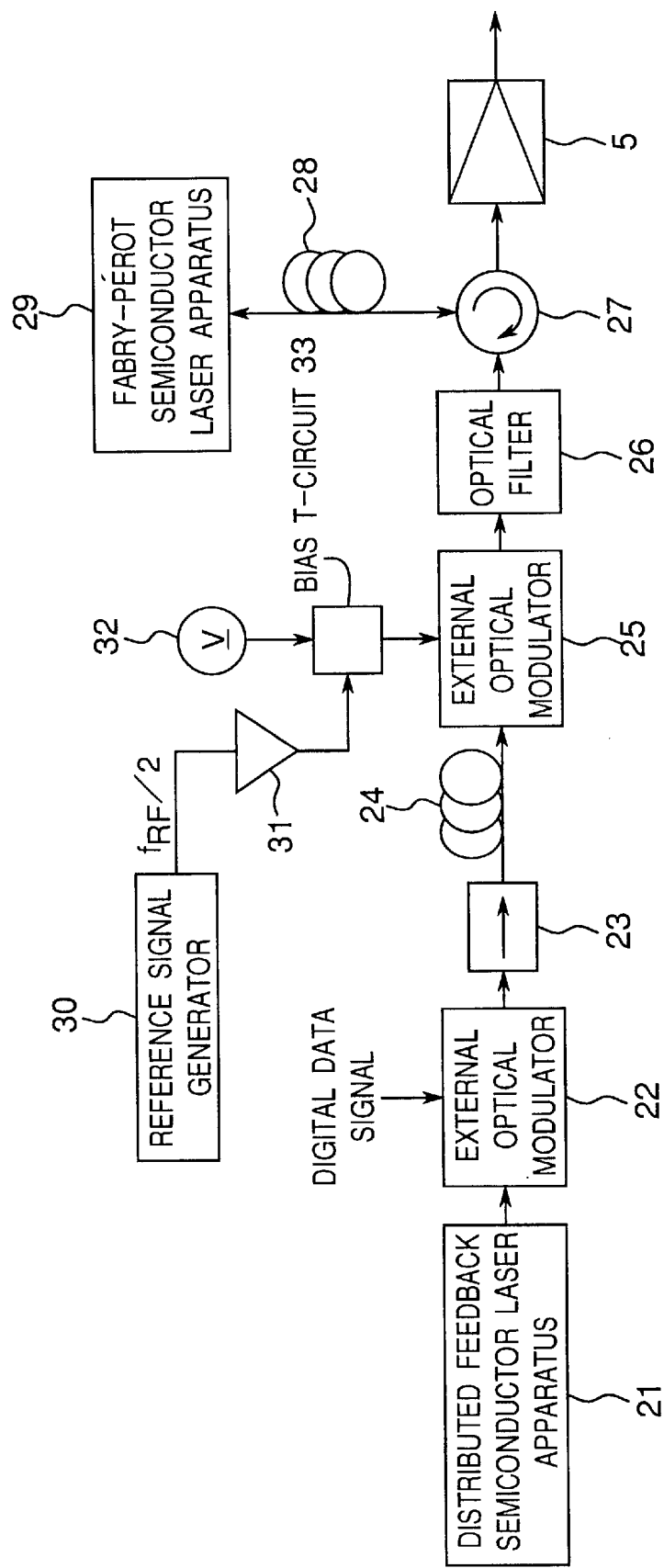
FIG. 1 is a block diagram showing a configuration of an optical transmitter 101a according to a first preferred embodiment of the present invention.

Preferred embodiments according to the present invention will be described below with reference to the attached drawings. Throughout the drawings, the same or similar parts are indicated by the same reference numerals.

FIRST PREFERRED EMBODIMENT

FIG. 1 is a block diagram showing a configuration of an optical transmitter 101a according to the first preferred embodiment of the present invention. As shown in FIG. 1, the rough configuration of the optical transmitter 101a according to the present preferred embodiment is characterized in that an optical signal generated by a single-mode distributed feedback semiconductor laser apparatus 21 is intensity-modulated according to a high-frequency signal having a predetermined radio frequency $f_{RF}/2$ by using a second external optical modulator 25 of, for example, a Mach-Zehnder optical modulator, so as to generate a master optical signal, which is then optically injected into a Fabry-Pérot semiconductor laser apparatus 29 so that predetermined two-mode optical signals are injection-locked into the semiconductor laser apparatus 29, and this leads to that two optical signals having an optical frequency difference of the radio frequency $f_{RF}$ can be generated from a multi-mode optical signal.

First of all, the configuration of the optical transmitter 101a according to the first preferred embodiment will be explained with reference to FIG. 1.

Referring to FIG. 1, a single-mode optical signal generated by the distributed feedback semiconductor laser apparatus 21 is inputted as a master optical signal to a first external optical modulator 22, which intensity-modulates the same master optical signal according to an inputted digital data signal, and then, outputs an intensity-modulated optical signal to the second external modulator 25 via an optical isolator 23 and a polarization-preserving optical fiber cable 24.

The second external optical modulator 25 is, for example, a Mach-Zehnder optical modulator, which is formed on an optical waveguide substrate made of, for example, $LiNbO_3$, and which has a nonlinear optical modulation characteristics. A DC bias voltage for optical modulation is inputted from a DC voltage source 32 via a bias T-circuit 33 to the second external optical modulator 25. On the other hand, a radio signal, which becomes a radio signal of the optical fiber link system, and which has one half of a predetermined radio frequency $f_{RF}$, is inputted from a reference signal generator 30 via a high-frequency amplifier 31 and the bias T-circuit 33 to the second external optical modulator 25. The second external optical modulator 25 intensity-modulates the inputted master optical signal according to the inputted radio signal by using its own nonlinear optical modulation characteristic, and then, outputs the resulting intensity-modulated optical signal to the Fabry-Pérot semiconductor laser apparatus 29 of a slave oscillator, via an optical filter 26, an optical circulator 27, and a polarization-preserving optical fiber cable 28, namely, the intensity-modulated optical signal is optically injected into semiconductor apparatus 29. Accordingly, the optical circulator 27 and the polarization-preserving optical fiber cable 28 constitute optical injection means.

The optical signal, which is intensity-modulated by the second external modulator 25, includes at least the following signals:

(a) an optical carrier wave having an oscillation wavelength of the distributed feedback semiconductor laser apparatus 21;

(b) side band signals of an optical signal corresponding to the digital data signal which is used upon intensity-modulating the optical carrier wave;

(c) further side band signals of predetermined specific two optical signals having an optical frequency difference of the above-mentioned radio frequency $f_{RF}$.

The above-mentioned optical filter 26 is of, for example, a band-pass filter, and is provided for removing or eliminating unnecessary side bands and carrier waves which may occur at the second external optical modulator 25, and for passing therethrough only predetermined specific two optical signals (side bands) having the optical frequency difference of a desired radio frequency $f_{RF}$. It is to be noted that, in the case where the second external optical modulator 25 of a Mach-Zehnder optical modulator is driven at such an operating point that gives the maximum loss, unnecessary carrier waves can be remarkably reduced, and in this case, it is not necessary to insert any optical filter 26.

In the present preferred embodiment, an antireflection film of a dielectric multi-layered film (AR coating layer) is formed on an end surface located at a light incident side of a semiconductor laser medium of the Fabry-Pérot semiconductor laser apparatus 29, so that the reflectivity is reduced to about 20 to 5 or several %, and this results in decrease in the Q value of the Fabry-Pérot semiconductor apparatus 29. In the Fabry-Pérot semiconductor laser apparatus 29, light-emitting parameters such as a temperature, an injection current or the like are adjusted so as to generate by itself such a plurality of multi-mode optical signals, which include predetermined specific two optical signals having substantially the same wavelengths as those of the above-mentioned predetermined specific two optical signals, respectively, and which are mode-coupled with each other.

In the preferred embodiment, a term "predetermined specific two optical signals having substantially the same wavelengths" means two optical signals that can be pulled-in by the injection locking. In other words, it means two optical signals located infrequency or wavelength within a pull-in range of the injection locking.

Then, from these multi-mode optical signals, the Fabry-Pérot semiconductor laser apparatus 29 selectively generates, by using the above-mentioned injection locking, a predetermined two-mode optical signals having the optical frequency difference of a predetermined radio frequency $f_{RF}$, and outputs the two-mode optical signals through the polarization-preserving optical fiber cable 28, the optical circulator 27, and an optical power amplifier 5.

In the optical transmitter 101a as constituted above, an optical signal generated by the distributed feedback semiconductor laser apparatus 21 is intensity-modulated according to a high-frequency signal by the second external optical modulator 25 to generate a master optical signal, which is in turn optically injected into the Fabry-Pérot semiconductor laser apparatus 29, so that two optical signal of the master optical signal are injection-locked into the predetermined specific two optical signals of the multi-mode optical signal, and then, the predetermined specific two optical signals can be selectively generated from the multi-mode optical signals. In other words, use of the Fabry-Pérot semiconductor laser apparatus 29 with a small Q value leads to not only a wider pull-in range of the injection locking, but also a wider variable range of millimeter-wave carrier wave frequencies.

Further, since the setting precision of the frequencies is determined nearly depending on the purity of frequencies of a reference sine-wave modulation signal, then there can be obtained a stable carrier wave frequency with relatively small phase noise after photoelectric conversion at the optical transmitter.

Still further, since the Fabry-Pérot semiconductor laser apparatus 29 has a large multi-mode oscillation band width, this leads to such advantageous effects that the distributed feedback semiconductor laser apparatus 21 of the master light source has a wider range for selecting its own oscillation frequency, and also there are such advantageous effects as low manufacturing cost and convenient for wavelength multiplexing. In other words, upon changing the oscillation frequency of the optical signal, it is advantageously sufficient to replace only the distributed feedback semiconductor laser apparatus 21 with another one.

Although the above-mentioned preferred embodiment utilizes as a modulation signal, the present invention is not limited to this, and a high-frequency signal having one half of the desired radio frequency $f_{RF}$, a high-frequency signal having ¼ or ⅛ of the desired radio frequency $f_{RF}$ may be used as the modulation signal. In this case, the nonlinear characteristic of the second external optical modulator 25 can be used to obtain two optical signals (side bands) having a desired optical frequency difference.

In the above-mentioned preferred embodiment according to the present invention, although a Mach-Zehnder optical modulator is used as the second external optical modulator 25, the present invention is not limited to this. An 3optical phase modulator may be used to phase-modulate the master optical signal, so as to generate desired two optical signals (side bands). In this case, an oscillation light of the carrier optical signal of the distributed feedback semiconductor laser apparatus 21 remains as it is, so that this oscillation light is removed by a Fiber-Bragg grating or Fabry-Pérot resonator used as the optical filter 26.

The distributed feedback semiconductor laser apparatus 21 may be combined with the first external optical modulator 22, namely, the distributed feedback semiconductor laser apparatus 21 may be provided so as to have a modulation function of the first external optical modulator 22 to provide and utilize a distributed feedback semiconductor laser apparatus provided with, for example, an electric-field absorption type (EA) modulator which has been known to those skilled in the art. In this case, the nonlinear characteristic of the electric-field absorption type optical modulator is utilized.

Alternatively, the first external optical modulator 22 and the second external optical modulator 25 may be exchanged in mounting position to combine the distributed feedback semiconductor laser apparatus 21 and the second external optical modulator 25, namely, distributed feedback semiconductor laser apparatus 21 may be provide with a modulation function of the second external optical modulator to provide and utilize a distributed feedback semiconductor laser apparatus provided with an electric-field absorption type (EA) optical modulator which has been known to those skilled in the art.

Figure 2:
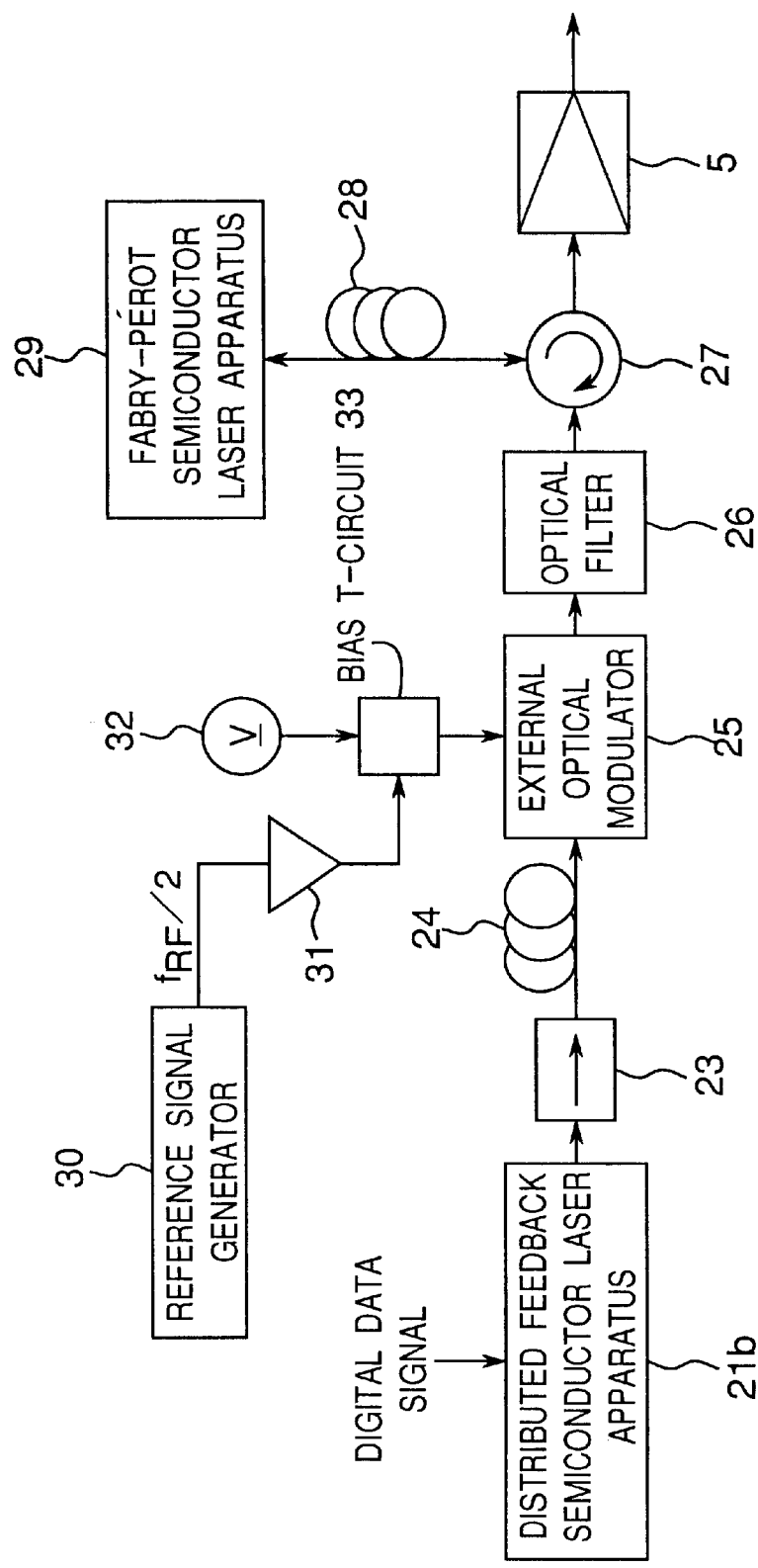
FIG. 2 is a block diagram showing a configuration of an optical transmitter 101aa according to a modified preferred embodiment of the first preferred embodiment of the present invention.

FIG. 2 is a block diagram showing a configuration of an optical transmitter 101aa, which is the former combination, according to a modified preferred embodiment of the first preferred embodiment of the present invention. In the modified preferred embodiment shown in FIG. 2, as compared with the first preferred embodiment shown in FIG. 1, the distributed feedback semiconductor laser apparatus 21 and the first external optical modulator 22 are combined so as to be integrated into a distributed feedback semiconductor laser apparatus 21b in configuration. In this case, the distributed feedback semiconductor laser apparatus 21b has a nonlinear optical modulation characteristic, intensity-modulates an optical signal generated by itself according to an inputted digital data signal, and outputs the modulated master optical signal to the second external optical modulator 25 via the optical isolator 23 and the polarization-preserving optical fiber cable 24.

SECOND PREFERRED EMBODIMENT

Figure 3:
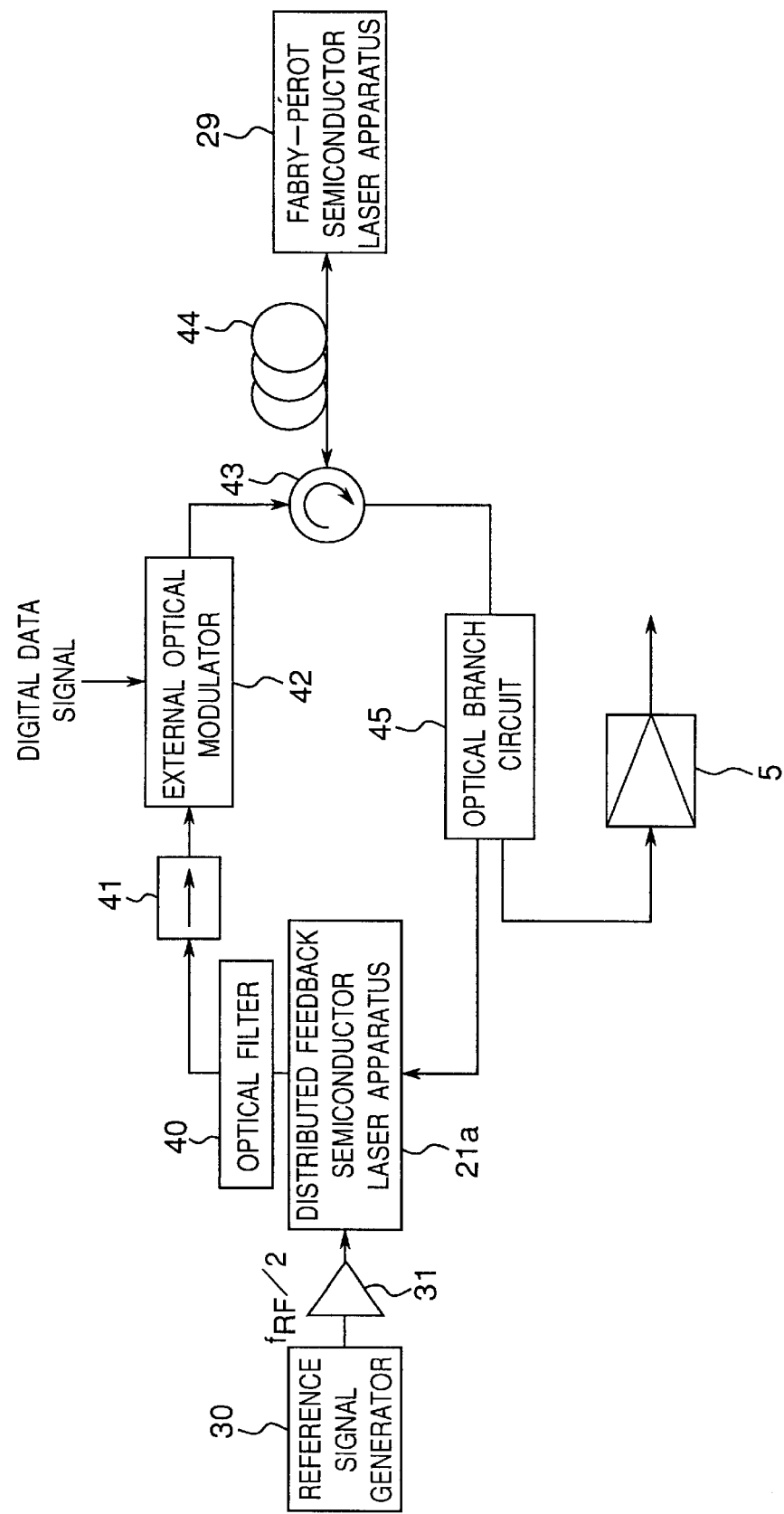
FIG. 3 is a block diagram showing a configuration of an optical transmitter 101b according to a second preferred embodiment of the present invention.

FIG. 3 is a block diagram showing a configuration of an optical transmitter 101b according to a second preferred embodiment of the present invention. The rough configuration of the optical transmitter 101b of FIG. 2 is characterized in constituting a mutual-injection locking type optical oscillation system, in which a single-mode distributed feedback semiconductor laser apparatus 21a is configured as a pass type one, an optical signal generated by distributed feedback semiconductor laser apparatus 21a is optically injected into a Fabry-Pérot semiconductor laser apparatus 29, and an optical signal generated by the Fabry-Pérot semiconductor laser apparatus 29 is optically injected into the distributed feedback semiconductor laser apparatus 21a.

Referring to FIG. 3, a high-frequency signal having one half of a radio frequency $f_{RF}$ is applied as a bias current from a reference signal generator 30 via a high-frequency amplifier 31 to the distributed feedback semiconductor laser apparatus 21a. The distributed feedback semiconductor laser apparatus 21a has a nonlinear optical modulation characteristic, and frequency-modulates its own generated optical signal according to an inputted high-frequency signal, to generate two-mode optical signals having an optical frequency-difference of the desired radio frequency $f_{RF}$, and then, the generated two-mode optical signals are optically injected into the Fabry-Pérot semiconductor laser apparatus 29, via an optical filter 40 for removing unnecessary side bands from the same two-mode optical signals and passing therethrough the predetermined specific two optical signals, an optical isolator 41, an external optical modulator 42 for intensity-modulating the two optical signals according to a digital data signal, an optical circulator 43, and a polarization-preserving optical fiber cable 44. Then, in a manner similar to that of the first preferred embodiment, from the multi-mode optical signals generated by itself, the Fabry-Pérot semiconductor laser apparatus 29 selects the predetermined two-mode optical signals having the optical frequency difference of the predetermined radio frequency $f_{RF}$, by using the above-mentioned injection locking, and then, outputs the selected predetermined two-mode optical signals, via the polarization-preserving optical fiber cable 44, the optical circulator 43, an optical branch circuit 45, and an optical power amplifier 5. Another optical signal branched from the optical branch circuit 45 is fed back to another end surface of the distributed feedback semiconductor laser apparatus 21a. This constitutes a pass-type semiconductor laser apparatus.

In other words, the distributed feedback semiconductor laser apparatus 21a, the optical filter 40, the optical isolator 41, the external optical modulator 42, the optical circulator 43, and the optical branch circuit 45 are formed in a shape of loop, in which the optical signal generated by the distributed feedback semiconductor laser apparatus 21a is optically injected into the Fabry-Pérot semiconductor laser apparatus 29, and the optical signal generated by the Fabry-Pérot semiconductor laser apparatus 29 is optically injected into the distributed feedback semiconductor laser apparatus 21a. This constitutes a mutual injection locking type optical oscillation system.

The optical transmitter 101b as configured above has the advantageous effects similar to those of the first preferred embodiment. Since the two laser apparatuses 21a and 29 mutually inject the generated optical signals into another one, the stability of long-term frequency precision can be improved even when there is caused a change in the temperature. Further, the optical transmitter 101b of the present preferred embodiment has an advantageous effect of a simple construction since it is not necessary to provide any second external optical modulator 25 shown in FIG. 1.

THIRD PREFERRED EMBODIMENT

Figure 4:
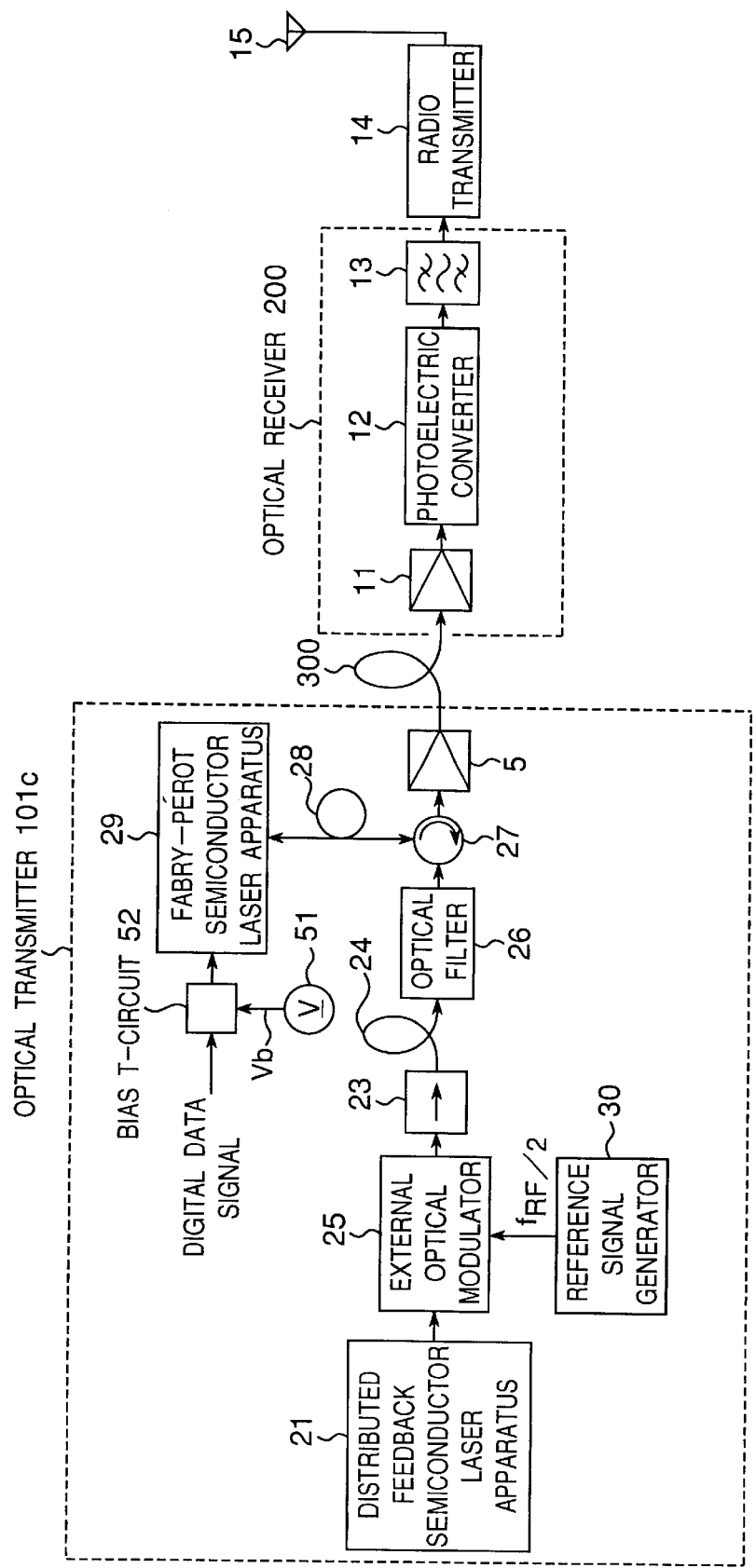
FIG. 4 is a block diagram showing an optical fiber link system provided with an optical transmitter 101c according to a third preferred embodiment of the present invention.

FIG. 4 is a block diagram showing a configuration of an optical fiber link system provided with an optical transmitter 101c, according to the third preferred embodiment of the present invention. The rough configuration of this optical transmitter 101c according to the third preferred embodiment is characterized in that, a single-mode optical signal generated by a distributed feedback semiconductor laser apparatus 21 are intensity-modulated by an external optical modulator 25 according to a radio signal having one half of a radio frequency $f_{RF}$, the resultant intensity-modulated optical signal including two optical signals (side bands) having an optical frequency difference of the radio frequency $f_{RF}$ is optically injected into a Fabry-Pérot semiconductor laser apparatus 29 via an optical circulator 27 and a polarization-preserving optical fiber cable 28, to injection-lock predetermined specific two optical signals of the above-mentioned optically-injected and intensity-modulated optical signal, into predetermined specific two optical signals of the above-mentioned multi-mode optical signals, so that the above-mentioned injection locking operation is turned on or off in accordance with a level of digital data signal to which a predetermined DC bias voltage is applied, and then, it is switched over whether or not the Fabry-Pérot semiconductor laser apparatus 29 generates the above-mentioned predetermined specific two optical signals.

Figure 11:
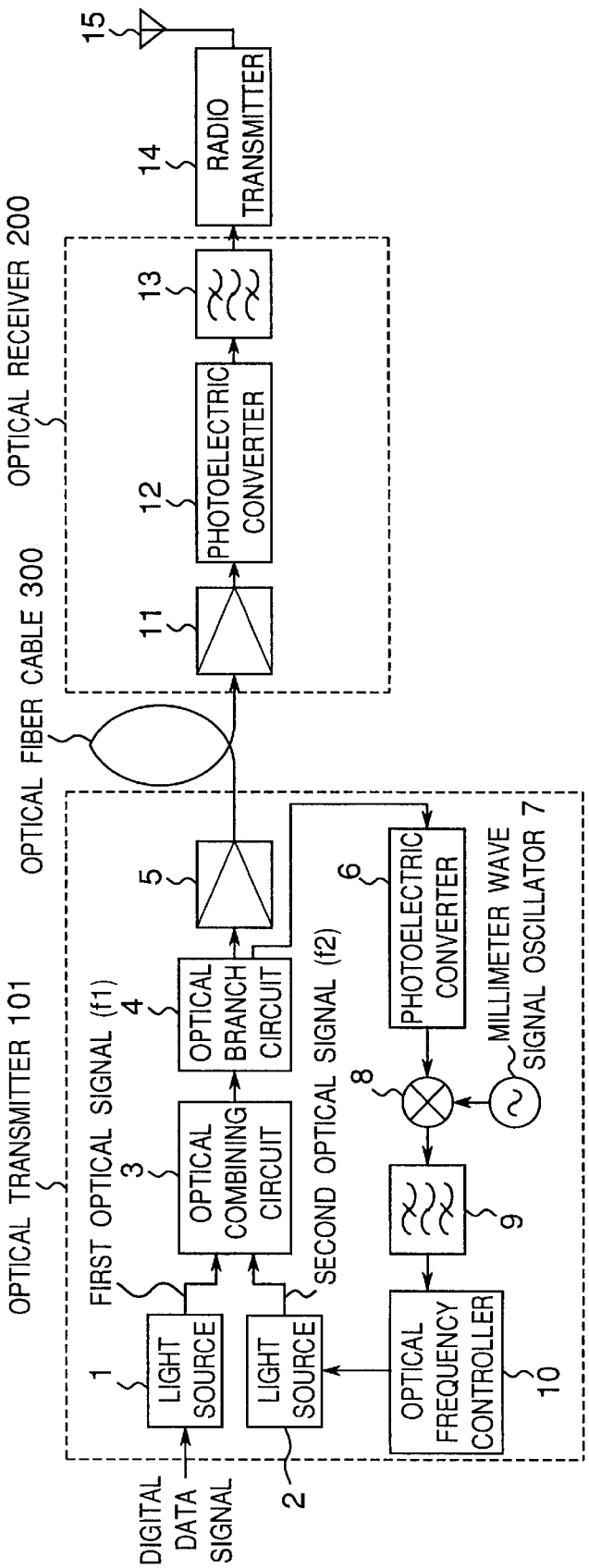
FIG. 11 is a block diagram showing a configuration of an optical fiber link system according to a first prior art.

It is to be-noted that the configuration of the stages following the optical circulator 27 is similar to that of the first preferred embodiment shown in FIG. 11.

Referring to FIG. 4, the external optical modulator 25 intensity modulates a single-mode optical signal generated by the distributed feedback semiconductor laser apparatus 21 according to a radio signal having one half of the radio frequency $f_{RF}$ generated by a reference signal generator 30, and optically injects the resultant intensity-modulated optical signal including predetermined specific two optical signals (side bands) having an optical frequency difference of the radio frequency $f_{RF}$ into the Fabry-Pérot semiconductor laser apparatus 29 via an optical isolator 23, a polarization-preserving optical fiber cable 24, an optical filter 26, the optical circulator 27, and the polarization-preserving optical fiber cable 28. On the other hand, the inputted digital data signal of, for example, a pulse signal, is applied to a bias T-circuit 52, and a predetermined DC bias voltage supplied from a DC voltage source 51 is applied to the digital data signal. The digital data signal thus biased only by the DC bias voltage is applied to the Fabry-Pérot semiconductor laser apparatus 29 as an injection current, and then, a direct modulation is conducted.

In this case, in the Fabry-Pérot semiconductor laser apparatus 29, in a manner similar to that of the first preferred embodiment, the Q value is lowered so as to generate multi-mode optical signals. The above-mentioned digital data signal is of, for example, a binary signal having high and low levels which are different from each other, and the above-mentioned DC bias voltage is adjusted and set to either of the following two cases.

(a) Case 1

When the digital data signal has the high level, the Fabry-Pérot semiconductor laser apparatus 29 becomes such an operating or enable state that an injection current exceeds a predetermined threshold value. In this state, the predetermined specific two optical signals of the optical signals after intensity-modulation, which are optically injected via the external optical modulator 25 from the distributed feedback semiconductor laser apparatus 21, are injection-locked into the predetermined specific two optical signals of the above-mentioned multi-mode optical signals (in an ON state of injection locking), so that the Fabry-Pérot semiconductor laser apparatus 29 generates the above-mentioned predetermined specific two optical signals corresponding to two modes which have simultaneously become the synchronous stable state, and then, outputs the generated predetermined specific two optical signals to an optical receiver 200 via the polarization-preserving optical fiber cable 28, the optical circulator 27, an optical amplifier 5, and an optical fiber cable 300. On the other hand, if the digital data signal has the low level, the Fabry-Pérot semiconductor laser apparatus 29 becomes a disable state (in an OFF state of injection locking) since the injection current is less than the above-mentioned threshold value, so that the Fabry-Pérot semiconductor laser apparatus 29 does not generate the above-mentioned predetermined specific two optical signals having levels above a predetermined significant level.

(b) Case 2

When the digital data signal has the low level, the Fabry-Pérot semiconductor laser apparatus 29 becomes such an operative or enable state that the injection current exceeds the predetermined threshold level. In this state, the predetermined specific two optical signals of the optical signals after intensity-modulation, which are optically injected via the external optical modulator 25 from the distributed feedback semiconductor laser apparatus 21, are injection-locked into the predetermined specific two optical signals of the above-mentioned multi-mode optical signals (in an ON state of injection locking), so that the Fabry-Pérot semiconductor laser apparatus 29 generates the above-mentioned predetermined specific two optical signals corresponding to two modes which have simultaneously become the synchronous stable state, and then, outputs the generated predetermined specific two optical signals to the optical receiver 200 via the polarization-preserving optical fiber cable 28, the optical circulator 27, the optical amplifier 5, and the optical fiber cable 300. On the other hand, if the digital data signal has the high level, the Fabry-Pérot semiconductor laser apparatus 29 becomes a saturation state since the injection current inputted into the semiconductor laser apparatus 29 becomes extremely large, and modes other than the modes of the above predetermined specific two optical signals becomes predominant (in an OFF state of injection locking). Accordingly, the above-mentioned predetermined specific two optical signals having levels above the predetermined significant level are not generated.

Figure 12:
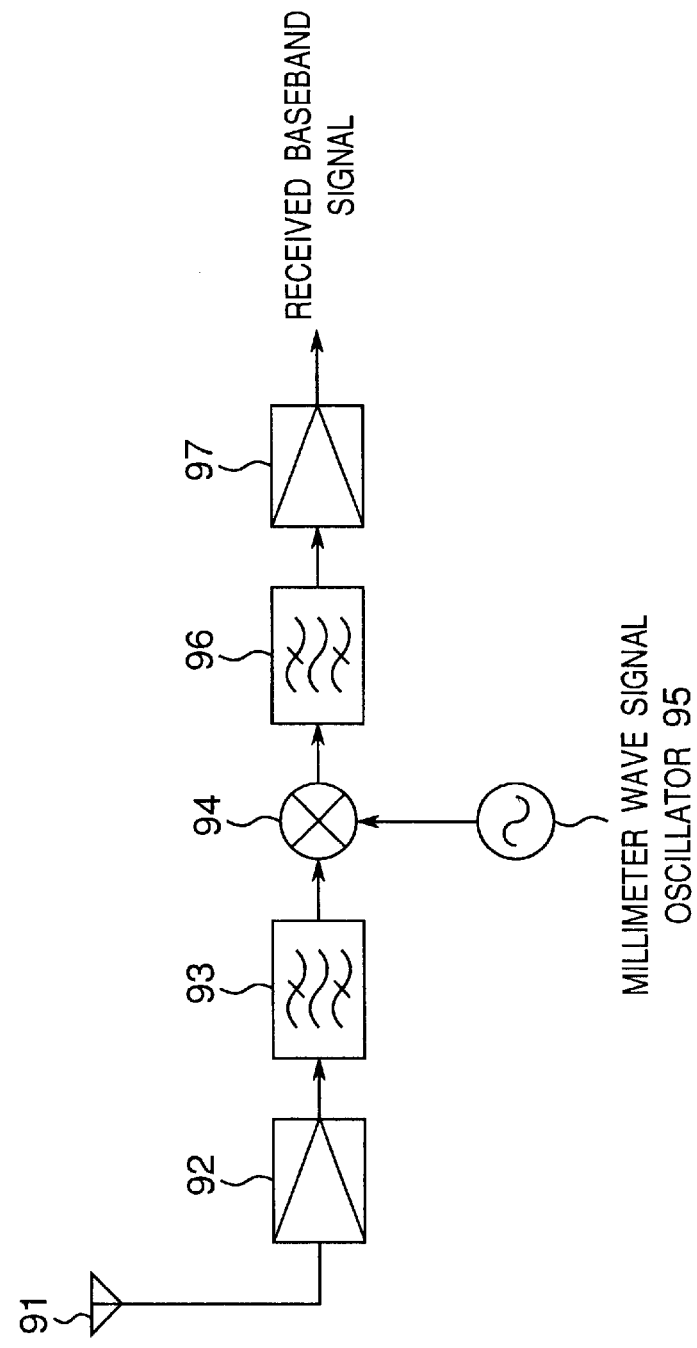
FIG. 12 is a block diagram showing a configuration of a radio receiver 210 according to the first prior art.
Figure 13:
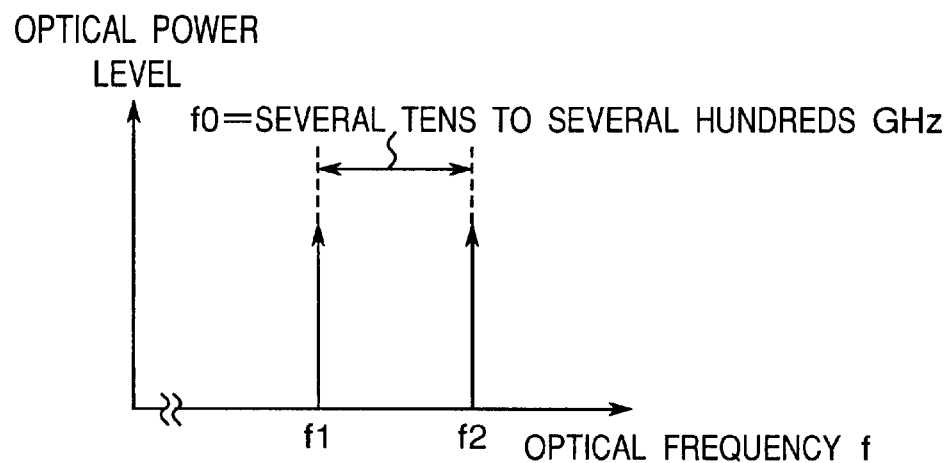
FIG. 13 is a graph showing an optical frequency spectra of two optical signals generated by an optical transmitter 101 of FIG. 11.
Figure 14:
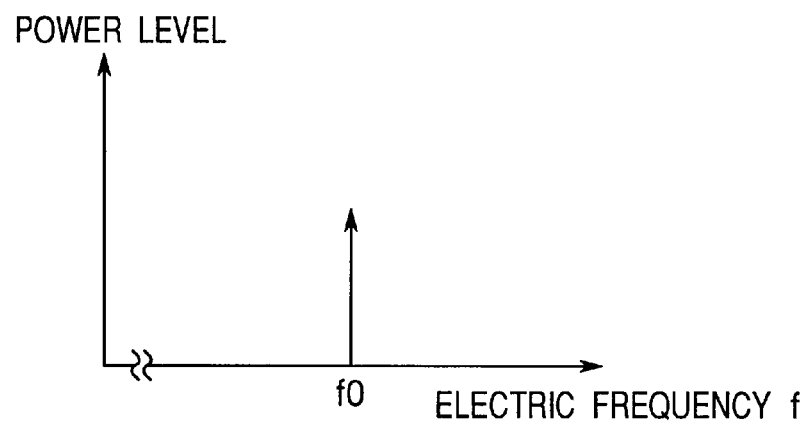
FIG. 14 is a graph showing an electrical frequency spectrum of an electric signal after photoelectric conversion in an optical transmitter 200 of FIG. 11

As described above, in both the cases 1 and 2, when turning on or off the above-mentioned injection locking operation in accordance with switching over between high and low levels of the digital data signal to which a predetermined DC bias voltage is applied, it is possible to switch over whether or not the Fabry-Pérot semiconductor laser apparatus 29 generates the above-mentioned predetermined specific two optical signals with a predetermined significant quenching ratio. By this switching operation, the above-mentioned predetermined specific two optical signals are turned on or off, that is, the radio transmitter 14 turns on or off the radio signal having the millimeter frequency $f_{RF}$, which is the optical frequency difference between the frequencies of the above-mentioned predetermined specific two optical signals. Therefore, for example, at a radio receiver 210 shown in FIG. 12, a binary radio signal with the radio carrier wave turned on or off is received, and a signal amplifier 97 can obtain a received binary base-band signal at its output end.

Accordingly, according to the present preferred embodiment, it is not necessary to provide any optical filter of the fourth prior art, and the digital data signal is inputted into the Fabry-Pérot semiconductor laser apparatus 29 for direct modulation. Therefore, the optical transmitter 101c of the present preferred embodiment has a configuration simpler than that of the fourth prior art, and has a manufacturing cost cheaper than that of the fourth prior art. Also, the optical transmitter 101c of the present preferred embodiment can transmit an optical signal according to a digital data signal.

FOURTH PREFERRED EMBODIMENT

Figure 5:
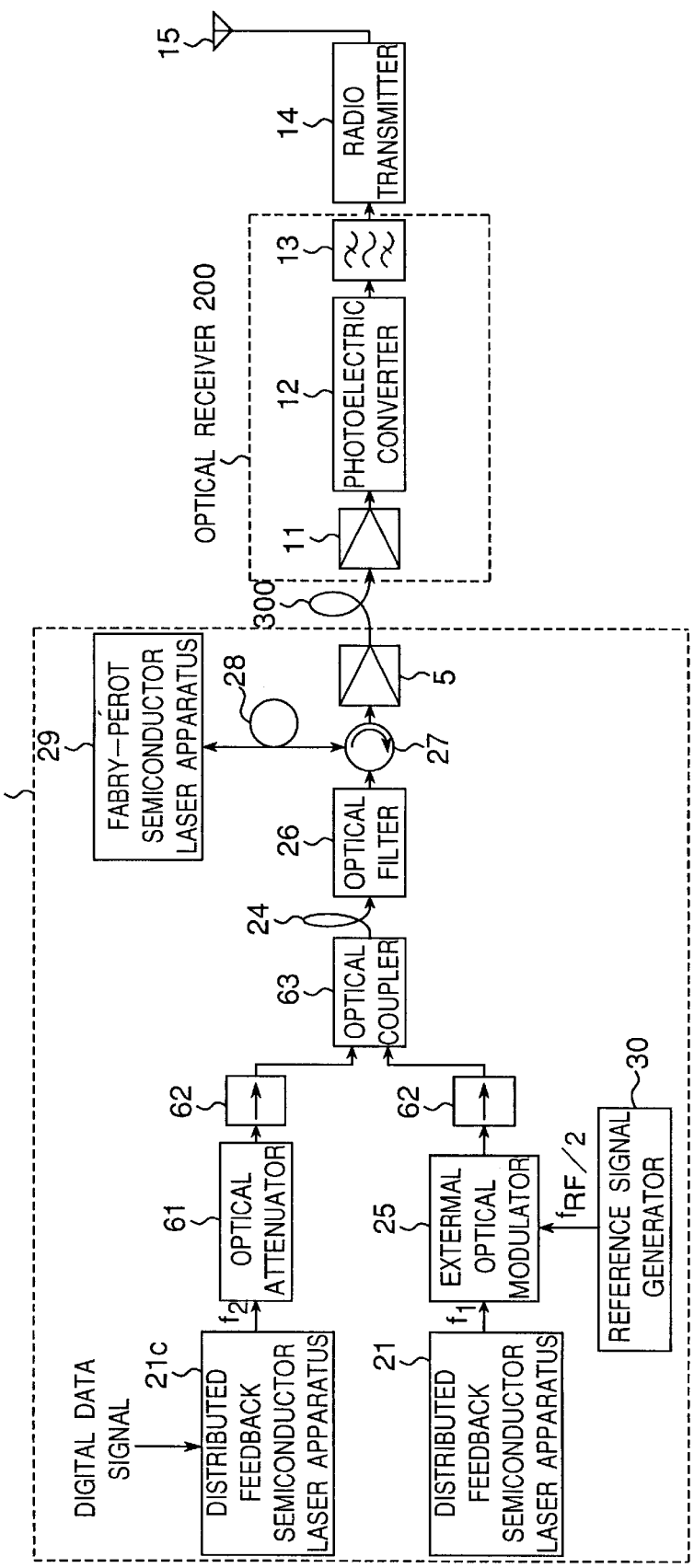
FIG. 5 is a block diagram showing an optical fiber link system provided with an optical transmitter 101d according to a fourth preferred embodiment of the present invention.
Figure 6:
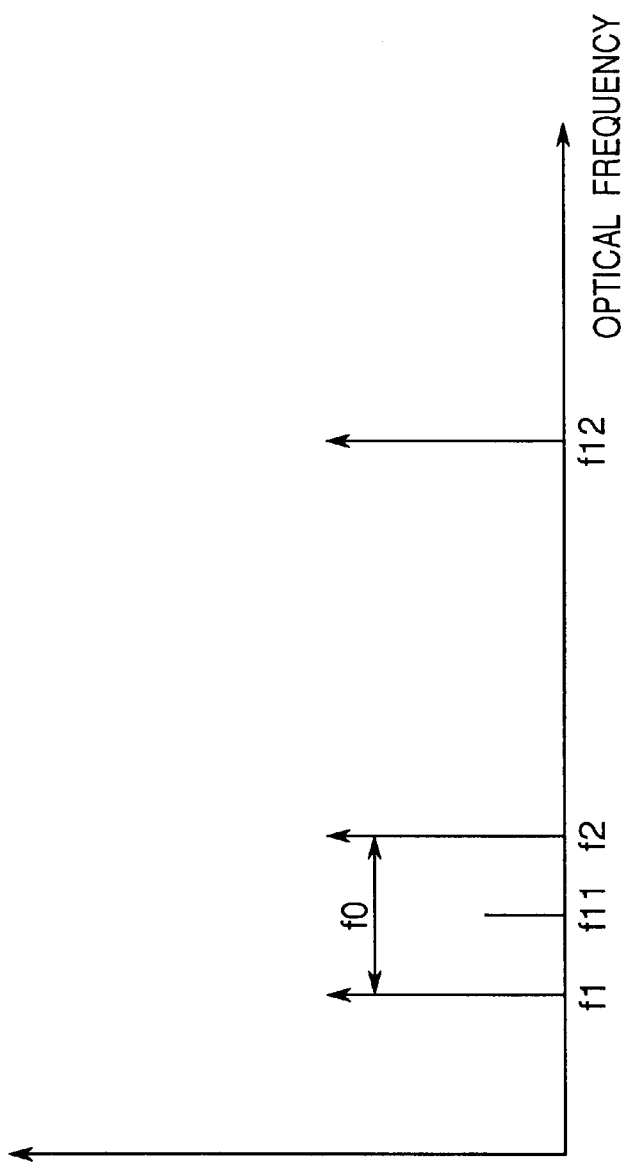
FIG. 6 is a graph showing an optical frequency characteristic of an optical power level of an output optical signal from an optical amplifier 5 shown in FIG. 5.

FIG. 5 is a block diagram showing a configuration of an optical fiber link system provided with an optical transmitter 101d according to the fourth preferred embodiment of the present invention, and FIG. 6 is a graph showing optical frequency characteristics of an optical power level of an output signal from an optical amplifier 5 of FIG. 5.

As shown in FIGS. 5 and 6, the optical transmitter 101d of the fourth preferred embodiment is characterized in that a single-mode optical signal having a first wavelength (optical frequency of f11) generated by a distributed feedback semiconductor laser apparatus 21 are intensity-modulated by an external optical modulator 25 according to a radio signal with one half of the radio frequency $f_{RF}$, and then, a first optical signal after intensity modulation including predetermined specific two optical signals (side bands for optical frequencies f1 and f2; where f1=f11−Δf, f2=f11+Δf) having an optical frequency difference of the radio frequency $f_{RF}$ is optically injected into a Fabry-Pérot semiconductor laser apparatus 29 via an optical circulator 27 and a polarization-preserving optical fiber cable 28. On the other hand, a second single-mode optical signal having a second wavelength (optical frequency f12) different from the first wavelength is intensity-modulated according to a digital data signal, and then, the intensity-modulated second optical signal is optically inject into the Fabry-Pérot semiconductor laser apparatus 29 via the optical circulator 27 and the polarization-preserving optical fiber cable 28. In this case, the above-mentioned predetermined specific two optical signals (having optical frequencies f1 and f2, respectively) of the intensity-modulated first optical signal are injection-locked into the predetermined specific two optical signals (having optical frequencies f1 and f2, respectively) of the above-mentioned multi-mode optical signals, while at the same time, the above-mentioned second optical signal (optical frequency f12) after intensity modulation are injection-locked into a further one optical signal (optical frequency f12) of the above-mentioned multi-mode optical signals. Then, when turning on or off both of the above-mentioned injection locking operations in accordance with the level of the above-mentioned data signal, the Fabry-Pérot semiconductor laser apparatus 29 switches over whether or not the Fabry-Pérot semiconductor laser apparatus 29 generates the above-mentioned predetermined specific two optical signals.

It is to be noted that the configuration of the stages following the optical circulator 27 is similar to that of the first prior art shown in FIG. 11.

Referring to FIG. 6, the external optical modulator 25 intensity-modulates a single-mode optical signal having the first wavelength (optical frequency f11) generated by the distributed feedback semiconductor laser apparatus 21 according to a radio signal with one half of the radio frequency $f_{RF}$ generated by a reference signal generator 30, and the resultant intensity-modulated optical signal including the predetermined specific two optical signals (side bands of optical frequencies f1 and f2) having the optical frequency difference of the radio frequency $f_{RF}$ is optically injected into the Fabry-Pérot semiconductor laser apparatus 29 via an optical isolator 23, a light-combining photo-coupler 63, a polarization-preserving optical fiber cable 24, an optical filter 26, the optical circulator 27, and the polarization-preserving optical fiber cable 28. On the other hand, the inputted digital data signal is applied as an injection current into a distributed feedback semiconductor laser apparatus 21c, which in turn generates the second optical signal (optical frequency f12) having the second wavelength, and which also intensity modulates the above-mentioned second optical signal generated according to the inputted digital data signal, and then, the resultant second intensity-modulated signals is optically injected into the Fabry-Pérot semiconductor laser apparatus 29 via an optical attenuator 62, an optical isolator 61, the photo-coupler 63, the polarization-preserving optical fiber cable 24, the optical filter 26, the optical circulator 27, and the polarization-preserving optical fiber cable 28. In this case, the Fabry-Pérot semiconductor laser apparatus 29 has its Q value decreased in a manner similar to that of the first preferred embodiment, and generates the multi-mode optical signals, which are coherent with each other and are also mode-coupled with each other, and which include optical signals having various wavelengths substantially coincident with those corresponding to the above-mentioned optical frequencies f1, f2 and f12.

In the present preferred embodiment, the above-mentioned digital data signal is of, for example, a binary signal having the high and low levels different from each other.

When the above-mentioned digital data signal has the low level, the second optical signal (optical frequency f12) generated by the distributed feedback semiconductor laser apparatus 21c are injection-locked into the optical signals with the optical frequency f12 of the multi-mode optical signals generated by the Fabry-Pérot semiconductor laser apparatus 29 (in an ON state of injection locking). On the other hand, when the above-mentioned digital data signal has the high level, an attenuation amount of the optical attenuator 61 is controlled to adjust the amount of optical injection of the second optical signal into the Fabry-Pérot semiconductor laser apparatus 29 so as to avoid the above-mentioned injection locking (in an OFF state of injection locking). In this case, the level of the second optical signal (optical frequency f12) generated by the distributed feedback semiconductor laser apparatus 21c changes with a predetermined significant quenching ratio corresponding to the level of the above-mentioned digital data signal, and in accordance with this, the level of the second optical signal (optical frequency f12) generated by the above-mentioned injection locking changes in a similar manner. Turning on and off operation of the injection locking for the second optical signal causes an amplification factor of the injection locking of the Fabry-Pérot semiconductor laser apparatus 29 to change, and this leads to turning on or off of the injection locking of the two optical signals which are the side bands of the first optical signal having the optical frequency f11 mode-coupled with the second optical signal having the optical frequency f12. In other words, the saturation state of the Fabry-Pérot semiconductor laser apparatus 29 is modulated to be turned on or off in accordance with the level of the digital data signal, namely, in accordance with the level of the second optical signal with the optical frequency f12.

Therefore, when the digital data signal has the low level and so injection locking is turned on, the predetermined specific two optical signals of the intensity-modulated optical signal optically injected from the distributed feedback semiconductor laser apparatus 21 via the external optical modulator 25 is injection-locked into the predetermined specific two optical signals of the above-mentioned multi-mode optical signals, the Fabry-Pérot semiconductor laser apparatus 29 generates the above-mentioned predetermined specific two optical signals corresponding to two modes which have simultaneously become a synchronously stable state, and then, outputs the generated predetermined specific two optical signals to an optical receiver 200 via the polarization-preserving optical fiber cable 28, the optical circulator 27, the optical amplifier 5, and an optical fiber cable 300. On the other hand, if the digital data signal has the high level, the injection locking is turned off, so that the above-mentioned predetermined specific two optical signals having a level above a predetermined significant level are not generated.

As described above, when turning on or off the above-mentioned injection locking in accordance with switching over between the high and low levels of the digital data signal, the Fabry-Pérot semiconductor laser apparatus 29 can switch over whether or not the Fabry-Pérot semiconductor laser apparatus 29 generates the above-mentioned predetermined specific two optical signals. By this switching operation, the above-mentioned predetermined specific two optical signals are turned on or off, namely, the radio transmitter 14 turns on or off the radio signal having the millimeter-wave frequency $f_{RF}$, which is an optical frequency difference between the frequencies of the above-mentioned predetermined specific two optical signals. Therefore, for example, at the radio receiver 210 shown in FIG. 12, the binary radio signal with its radio carrier wave being turned on or off can be received, and there is obtained a received base-band binary signal at an output end of the signal amplifier 97.

In the fifth prior art, it is necessary to provide the three distributed feedback semiconductor laser apparatuses having matched oscillation frequencies. On the other hand, in the present preferred embodiment, the Fabry-Pérot semiconductor laser apparatus 29 has a wide range of oscillation frequencies, and this in turn makes wide, the oscillation frequency selection range of the distributed feedback semiconductor laser apparatus 21c, and then, it is not necessary to provide selection of oscillation frequencies of the light sources. Accordingly, it is possible to constitute the two-optical signal generator, which has a simple configuration provided with two distributed feedback semiconductor lasers having different oscillation frequencies, and which can transmit the optical signal according to the digital data signal.

MODIFIED PREFERRED EMBODIMENTS

Figure 7:
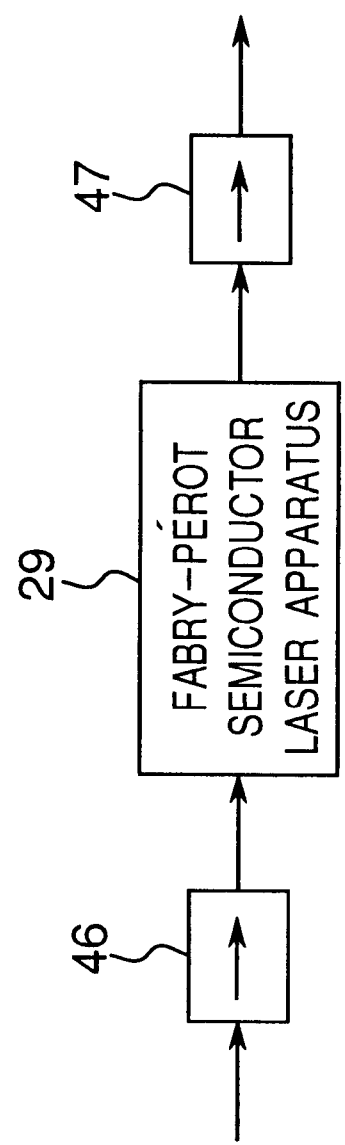
FIG. 7 is a block diagram showing a peripheral circuit of a Fabry-Pérot semiconductor laser apparatus 29 according to a modified preferred embodiment of the present invention.

FIG. 7 is a block diagram showing a peripheral circuit of a Fabry-Pérot semiconductor laser apparatus 29 of a modified preferred embodiment.

In the first preferred embodiment shown in FIG. 1, an optical circuit consisting of the optical circulator 27, the polarization-preserving optical fiber cable 28, and the Fabry-Pérot semiconductor laser apparatus 29 is inserted between the optical filter 26 and the optical power amplifier 5, as shown in FIG. 7. Alternatively, in order to remove the optical circulator 27, optical isolators 46 and 47 may be provided on both sides of both end surfaces of a laser medium of the Fabry-Pérot semiconductor laser apparatus 29, and this leads to a pass type of Fabry-Pérot semiconductor laser apparatus 29 through which the optical signal passes.

In this case, by forming a antireflection film on both end surfaces of the Fabry-Pérot semiconductor laser apparatus 29, the Q value thereof is reduced.

Also in the third and fourth preferred embodiments, the Fabry-Pérot semiconductor laser apparatus 29 of FIG. 7 may be used in a similar manner. Further, in the second preferred embodiment shown in FIG. 3, the optical circuit of FIG. 7 may be inserted between the external optical modulator 42 and the optical branch circuit 45 in a similar manner.

Although the above-mentioned preferred embodiments have the distributed feedback semiconductor laser apparatuses 21b and 21c for performing intensity modulation according to a digital data signal, the present invention is not limited to this. There may be utilized any other modulation such as phase modulation, frequency modulation or the like for generating at least side bands on both sides. Also, although the external optical modulator 25 is provided for intensity modulation, the present invention is not limited to this. There may be utilized any other modulation such as phase modulation, frequency modulation or the like for generating at least side bands on both sides.

Although in the above-mentioned preferred embodiments the distributed feedback semiconductor laser apparatus 21a performs frequency modulation for optical signals according to a digital data signal, the present invention is not limited to this. Any other modulation may be used such as intensity modulation, phase modulation or the like.

Although in the above-mentioned preferred embodiments there is used the Fabry-Pérot semiconductor laser apparatus 29 with a reduced Q value, the present invention is not limited to this. There may be used any other type of light source such as a laser apparatus which emits multi-mode optical signals.

Although in the above-mentioned preferred embodiments the reference signal generator 30 generates high-frequency signals having one half of the predetermined radio frequency $f_{RF}$, the present invention is not limited to this. There may be used a signal having an appropriate frequency lower than those of the high-frequency signals.

EXPERIMENTS AND EXPERIMENTAL RESULTS

The results of experiments using the optical transmitter 101a of the first preferred embodiment will be described below. In the Fabry-Pérot semiconductor laser apparatus 29, when assuming that an adjacent mode interval is approximately 60 GHz, and one half of the sine-wave signal frequency $f_{RF}$ applied to the external optical modulator 25 is near 30 GHz, two predetermined specific mode optical signals are injection-locked so as to be selected and amplified from multi-modes optical signals. In order to observe high-frequency carrier wave signals after photoelectric conversion by the optical receiver, the high-speed photodiode 12 (whose band width is 50 GHz) and an spectrum analyzer were used.

Figure 8:
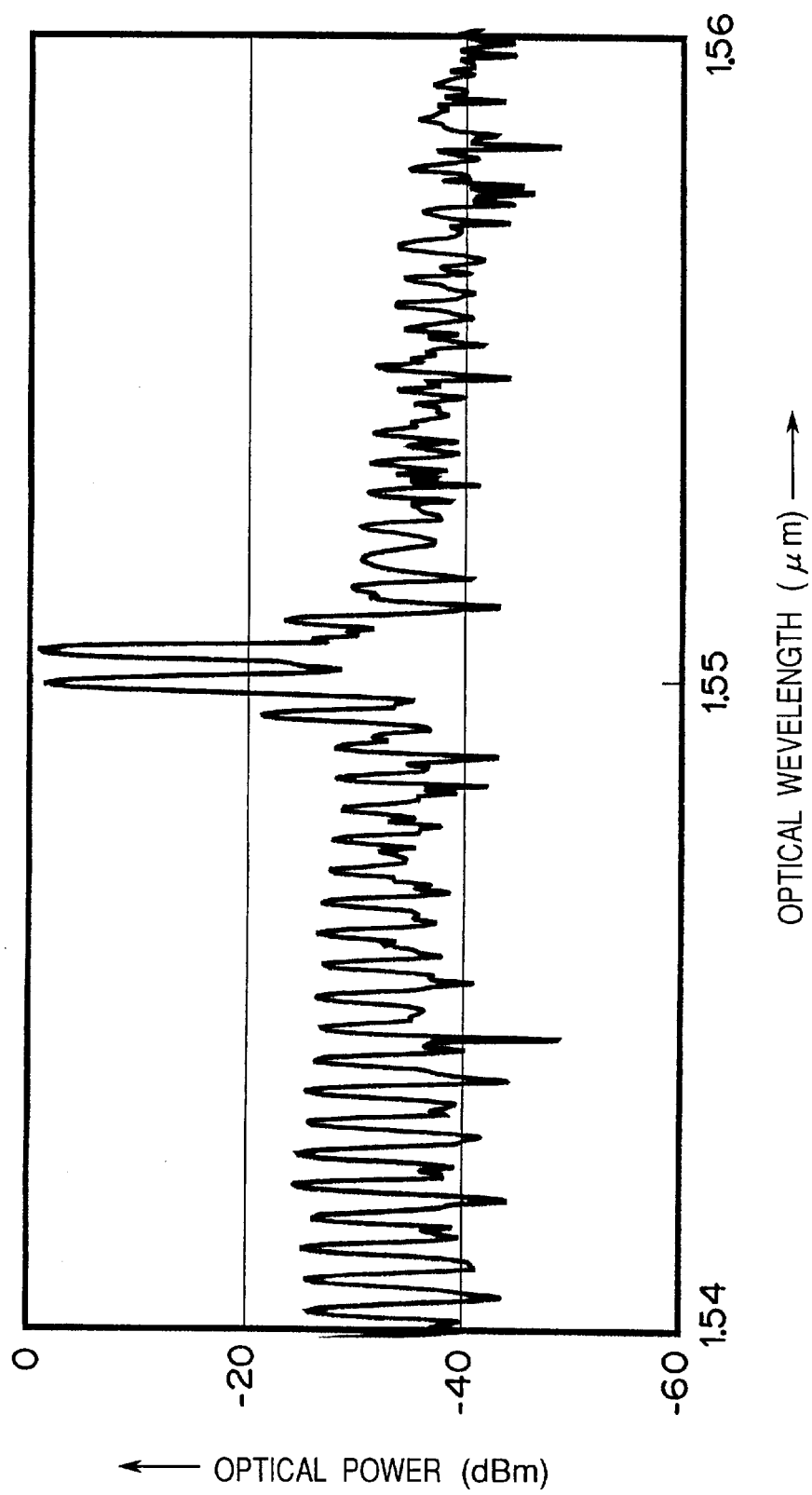
FIG. 8 is a graph showing spectra of two optical signals outputted from the optical transmitter 101a shown in FIG. 1.

A spectrum of an outputted optical signal at the time of injection locking is shown in FIG. 8. The oscillation wavelength of the distributed feedback semiconductor laser apparatus 21 was 1549.75 nm, the output optical intensity of the external optical modulator 25 was −18 dBm, one half of the modulation frequency $f_{RF}$ was 30 GHz, the injection current into the Fabry-Pérot semiconductor laser apparatus 29 was 58.5 mA, the ambient temperature was 20.0° C., and the optical intensity of a spectrum synchronized was −1 dBm.

Figure 9:
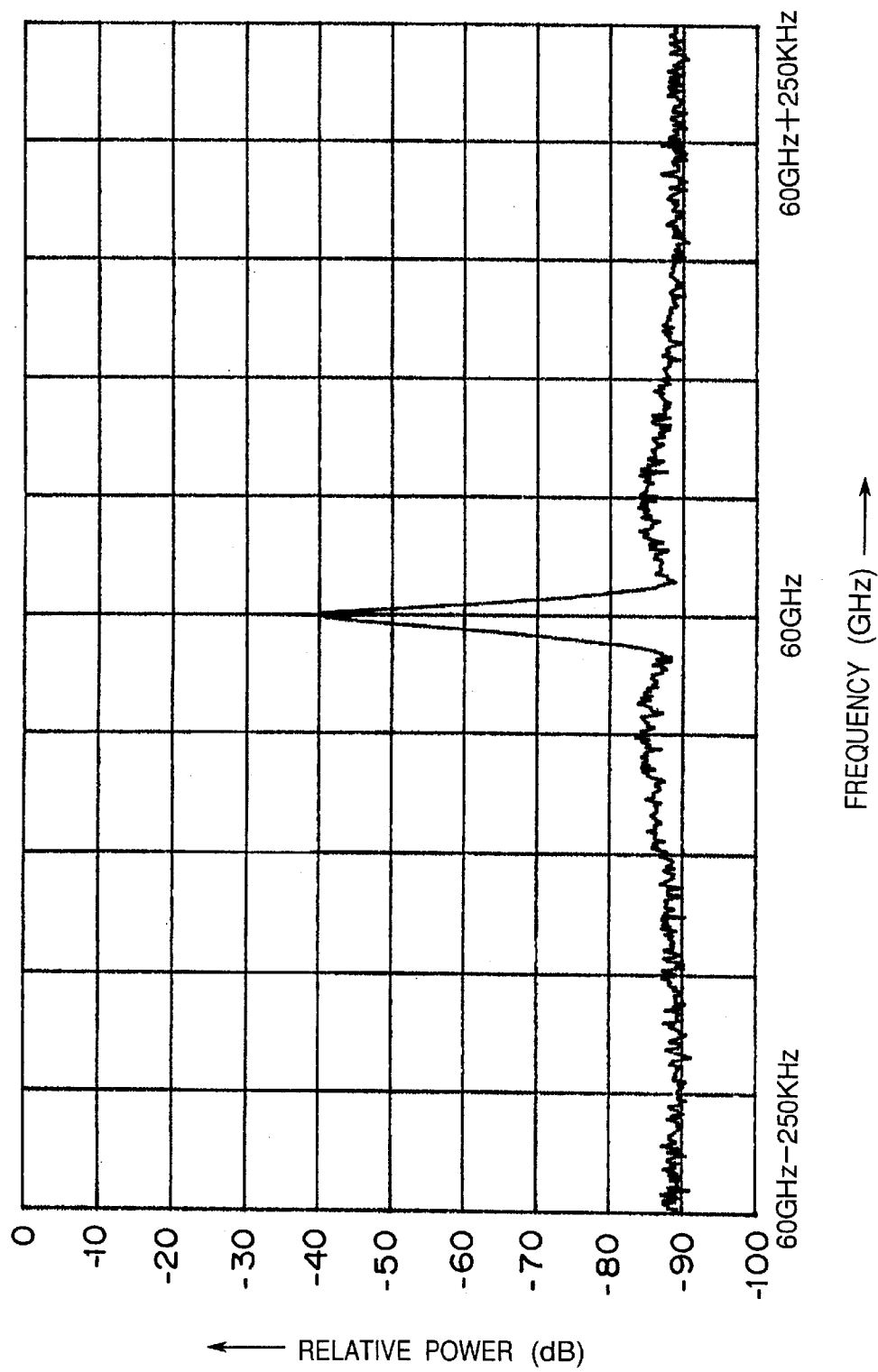
FIG. 9 is a graph showing a frequency spectrum of a radio signal when the two optical signals of FIG. 8 are photoelectrically converted.
Figure 10:
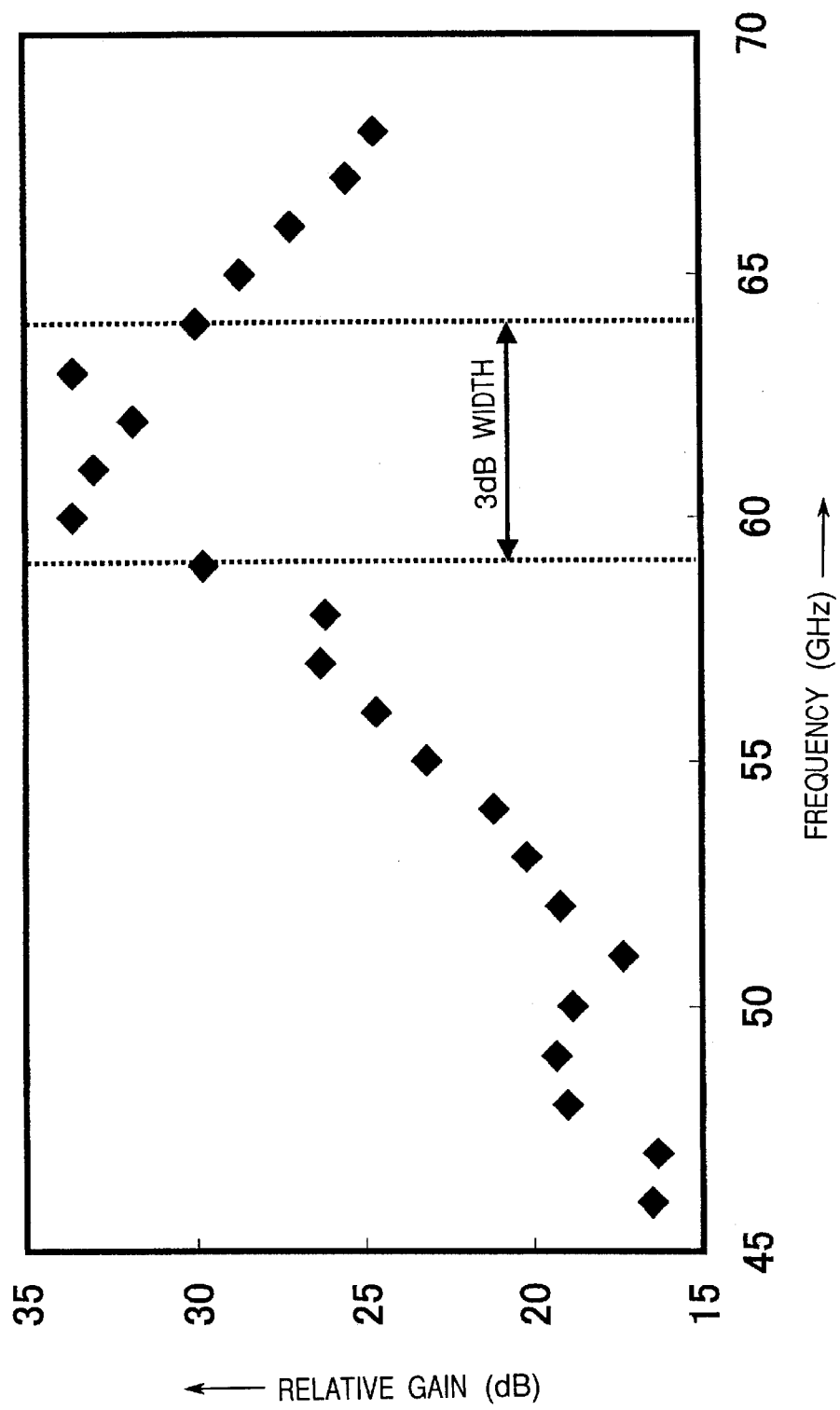
FIG. 10 is a graph showing a gain characteristic of a radio frequency of a radio signal before and after an injection locking which is caused in the optical transmitter 101a of FIG. 1.

A high-frequency spectrum at 60 GHz after photoelectric conversion in this case is shown in FIG. 9. As apparent from FIG. 9, an intensity of −26.3 dBm was obtained including a conversion efficiency of the photodiode 12. Also, with a frequency offset of 100 kHz from the maximum peak, a good phase-noise characteristic value of −89 dBc/Hz was obtained. Also, the frequency of the carrier wave was changed by adjusting the modulation frequency of the high-frequency signal applied to the external optical modulator 25, and then, we checked a high-frequency gain (See FIG. 10) to millimeter-wave frequencies, where the high-frequency gain is defined as a ratio in high-frequency intensity of an optical output power from the Fabry-Pérot semiconductor laser apparatus 29 at the time of injection locking to an optical output power from the external optical modulator 25. This check came up with results of a maximum gain of 33 dB at 60 GHz with a wide gain half-width of 59 to 64 GHz. Also, a generation range of the carrier wave signal (or radio signal) was found to be wide in a range from 46 GHz to 70 GHz. This is considered due to a wide pull-in range of injection locking caused by a lower Q value as a resonator of the Fabry-Pérot semiconductor laser apparatus 29. It was also found that nearly the equivalent results are obtained with a wide range for selecting the wavelength of the master light source even when the oscillation wavelength of the distributed feedback semiconductor laser apparatus 21 of the master light source is 1540 nm and 1560 nm, since the emission spectrum band width for the Fabry-Pérot semiconductor laser apparatus 29 was 20 nm or larger.

As described above, the present experiment confirmed that such a configuration that uses the Fabry-Pérot semiconductor laser apparatus 29 as a slave laser provides an ability to generate a millimeter-wave carrier wave which has a reference frequency equal to one half of a desired carrier wave frequency, which has a wide range for variable frequencies of the output power and also has a wide range for selecting the wavelength of the master laser light source.

Further, the inventors conducted experiments by manufacturing the optical transmitters 101c and 101d related to the third and fourth preferred embodiments, respectively, and we confirmed that, when intensity modulation is performed at the same time for predetermined two-mode signals according to the digital data signal by using direct modulation (in third preferred embodiment) on the Fabry-Pérot semiconductor laser apparatus, and injection of the intensity-modulated light (in fourth preferred embodiment), these predetermined two-mode optical signals were switched over in accordance with the level of binary values of the digital data signal.

ADVANTAGEOUS EFFECTS OF THE INVENTION

As described above in detail, the two-optical signal generator according to the first aspect of the present invention comprises a single-mode first light source, and a multi-mode second light source. In the two-optical signal generator, the optical signal generated by the first light source is modulated according to an inputted signal, and the modulated optical signal including predetermined specific two optical signals having the predetermined optical frequency difference is optically injected into the second light source, so as to injection-lock the predetermined specific two optical signals into the predetermined specific two optical signals of the above-mentioned multi-mode optical signals, thereby generating the so above-mentioned two injection-locked predetermined optical signals from the second light source.

Accordingly, by using, for example, a Fabry-Pérot type second light source with a lower Q value, the pull-in range for injection locking and the variable range of millimeter-wave carrier frequency can be both wide, and a setting precision for frequencies can be roughly determined by the frequency purity of the reference sine-wave modulation signal, thereby obtaining the stable carrier wave frequency with low phase noise after photoelectric conversion at the optical receiver. Also, since, for example, a Fabry-Pérot type second light source has a wide multi-mode oscillation band width, there is provided a wide range for selecting an oscillation frequency of the first light source on the master laser, and this leads to advantageous effects of cost reduction and convenient upon wavelength multiplexing. That is, when changing the oscillation wavelength of the optical signal, only the first light source needs to be replaced.

Also, the two-optical signal generator according to the second aspect of the present invention comprises (a) the first light source for modulating the single-mode optical signal according to an inputted signal and outputting the optical signal after modulation including the predetermined specific two optical signals having the predetermined optical frequency difference, and (b) the multi-mode second light source. In the two-optical signal generator, the modulated optical signal from the first light source are optically injected into the second light source, the optical signal from the second light source is optically injected into the first light source, and also the predetermined specific two optical signals of the modulated optical signal are injection-locked into the predetermined specific two optical signals of the above-mentioned multi-mode optical signals, then this leads to that the second light source generates the above-mentioned predetermined specific two optical signals injection-locked.

Accordingly, by using, for example, a Fabry-Pérot type second light source with a lower Q value, the pull-in range for injection locking can be wide and the variable range of millimeter-wave carrier wave frequency can also be wide and also the setting precision for frequencies can be roughly determined by the frequency purity of the reference sine-wave modulation signal, thereby obtaining the stable carrier wave frequency with low phase noise after photoelectric conversion at the optical receiver. Also, since the Fabry-Pérot type second light source has a wide range of the multi-mode oscillation band, the master first light source has a wide range for selecting oscillation frequencies, and this results in advantageous effects of cost reduction and convenient upon wavelength multiplexing. That is, when changing the oscillation wavelength of optical signals, advantageously only the first light source needs to be replaced. Further, because of the mutual injection locking between the first and second light sources, the long-term stability of the frequency precision is improved even in change in the temperature. Furthermore, it is not necessary to provide any optical modulation means, and this leads to a simple configuration of the two-optical signal generator.

Furthermore, the two-optical signal generator according to the third aspect of the present invention comprises the single-mode first light source and the second light source which modulates its own multi-mode optical signal according to a data signal. In the two-optical signal generator, the optical signals from the first light source are modulated according to an inputted signal, the modulated optical signal including the predetermined specific two optical signals having the predetermined optical frequency difference are optically injected into the second light source, so as to injection-lock the predetermined specific two optical signals of the above-mentioned modulated optical signal, into the predetermined specific two optical signals of the above-mentioned multi-mode optical signal. Then when turning on or off the above-mentioned injection locking according to the level of the above-mentioned data signal, the above-mentioned second light source is switched over whether or not the second light source generates the above-mentioned predetermined specific two optical signals.

Accordingly, in the two-optical signal generator, it is not necessary to provide any optical filter of the fourth prior art. Since the digital data signal is inputted to the second light source for direct modulation, this leads to not only a simple configuration of the two-optical signal generator, but also an inexpensive manufacturing cost lower than that of the fourth prior art. Further, the two-optical signal generator can transmit the optical signal according to the digital data signal.

Still further, the two-optical signal generator according to the fourth preferred embodiment of the present invention comprises (a) the first light source for generating the single-mode first optical signal, (b) the second light source for modulating its own single-mode second optical signal according to an inputted data signal, and (c) the third light source for generating the multi-mode optical signal including optical signals mode-coupled with each other. In the two-optical signal generator, the first optical signal after modulation according to the inputted signal and the second optical signal from the second light source are optically injected into the third light source, so as to injection-lock the predetermined specific two optical signals of the above-mentioned modulated first optical signal into predetermined specific two optical signals of the above-mentioned multi-mode optical signal, and so as to injection-lock the above-mentioned modulated second optical signal into another optical signal of the above-mentioned multi-mode optical signals. Then when turning on or off both of the above two injection locking operations in accordance with the level of the above-mentioned data signal, the second light source is switched over whether or not the second light source generates the above predetermined specific two optical signals from the second light source.

In the fifth prior art, it is necessary to provide three distributed feedback semiconductor laser apparatuses which are matched in oscillation frequency. However, since the present invention has a relatively wide possible range for frequency oscillation of the third light source in, for example, a Fabry-Pérot semiconductor laser apparatus, this leads to a wide range for selecting oscillation frequencies of the second light source, and it is not necessary to select the oscillation frequencies of the light sources. Therefore, it is possible to constitute the two-optical signal generator having a simple configuration which is provided with two-optical sources having different oscillation frequencies. Further, the two-optical signal generator can transmit the optical signal according to the digital data signal.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A two-optical signal generator, comprising:

a first light source for generating a single-mode first optical signal having a predetermined first wavelength;

optical modulation means for modulating the first optical signal generated by said first light source according to an inputted signal, and outputting a modulated first optical signal including predetermined specific two optical signals having a predetermined optical frequency difference;

a second light source for generating a single-mode second optical signal having a second wavelength difference from the first wavelength, modulating the generated second optical signal according to an inputted data signal, and outputting a modulated second optical signal; and a third light source for generating a multi-mode optical signal including a plurality of optical signals which are mode-coupled, said multi-mode optical signal including, (a) predetermined two further optical signals having substantially the same wavelengths as those of the predetermined specific two optical signals of the modulated first optical signal, respectively, and (b) another optical signal having substantially the same wavelength as that of the second optical wavelength; and optical injection means for optically injecting the modulated first optical signal outputted from said optical modulation means and the modulated second optical signal outputted from said second light source, into said third light source, wherein the predetermined specific two optical signals of the modulated first optical signal are injection-locked into the predetermined two further optical signals of the multi-mode optical signal, and the modulated second optical signal are injection-locked into another optical signal of the multi-mode optical signal, and wherein the two injection locking are turned on or off in accordance with a level of the data signal, thereby switching over whether or not said second light source generates the predetermined specific two optical signals.

* * * * *

UNITED STATES PATENT AND TRADEMARK OFFICE
CERTIFICATE OF CORRECTION

PATENT NO.   : 6,674,969 B1                                                                 Page 1 of 1
DATED        : January 6, 2004
INVENTOR(S)  : Ogusu It is certified that error appears in the above-identified patent and that said Letters Patent is hereby corrected as shown below:

Title page,
Item [54], Title, please change "TWO-OPTICAL SIGNAL GENERATOR FOR GENERATING TWO OPTICLE SIGNALS HAVING ADJUSTABLE OPTICAL FREQUENCY DIFFERENCE" to -- TWO-OPTICA SIGNAL GENERATOR FOR GENERATING TWO OPTICAL SIGNALS HAVING ADJUSTABLE OPTICAL FREQUENCY DIFFERENCE --
Item [56], References Cited, OTHER PUBLICATIONS, "R.P. Braun, et al." reference, please change "*OpticLE millimetre-wave generation and transmission experiments for mobile 60 GHz band communications*, R.P. Bran, et al., *Electronics Letters*, vol. 32, No. 7, pp. 626-628, Mar. 28, 1996" to -- *Optical millimetre-wave generation and transmission experiments for mobile 60 GHz band communications*, R.P. BraUn, et al., *Electronics Letters*, vol. 32, No. 7, pp. 626-628, Mar. 28, 1996 --.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,674,969 B1 Page 1 of 1
APPLICATION NO. : 09/511095
DATED : January 6, 2004
INVENTOR(S) : Ogusu It is certified that error appears in the above-identified patent and that said Letters Patent is hereby corrected as shown below:

<u>Title page,</u>

Item (54), please change the title from

"TWO-OPTICA SIGNAL GENERATOR FOR GENERATING TWO OPTICAL SIGNALS HAVING ADJUSTABLE OPTICAL FREQUENCY DIFFERENCE"

to

--TWO-OPTICAL SIGNAL GENERATOR FOR GENERATING TWO OPTICAL SIGNALS HAVING ADJUSTABLE OPTICAL FREQUENCY DIFFERENCE--

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,674,969 B1 | Page 1 of 1 |
| APPLICATION NO. | : 09/511095 | |
| DATED | : January 6, 2004 | |
| INVENTOR(S) | : Ogusu | |

It is certified that error appears in the above-identified patent and that said Letters Patent is hereby corrected as shown below:

Title page,

Item (54), please change the title from

" TWO-OPTICA SIGNAL GENERATOR FOR GENERATING TWO OPTICAL SIGNALS HAVING ADJUSTABLE OPTICAL FREQUENCY DIFFERENCE"

to

--TWO-OPTICAL SIGNAL GENERATOR FOR GENERATING TWO OPTICAL SIGNALS HAVING ADJUSTABLE OPTICAL FREQUENCY DIFFERENCE--

Signed and Sealed this

Fifteenth Day of May, 2007

JON W. DUDAS
*Director of the United States Patent and Trademark Office*